United States Patent [19]

Landsberger et al.

[11] Patent Number: 5,203,646

[45] Date of Patent: Apr. 20, 1993

[54] CABLE CRAWLING UNDERWATER INSPECTION AND CLEANING ROBOT

[75] Inventors: Samuel E. Landsberger, Ithaca, N.Y.; Raj Sundra, Bedford, Mass.; David B. Short, Fair Oaks, Calif.; Benjamin F. Martin, Ithaca, N.Y.

[73] Assignee: Cornell Research Foundation, Inc., Ithaca, N.Y.

[21] Appl. No.: 831,878

[22] Filed: Feb. 6, 1992

[51] Int. Cl.$^5$ ............................................. B08B 9/04
[52] U.S. Cl. ................................... 405/191; 405/154; 15/104.31; 104/138.2; 24/132 WL; 901/1; 901/44
[58] Field of Search ............... 405/154, 158, 190, 191; 15/104.05, 104.31; 104/23.2, 112, 138.2; 901/1, 44; 24/115 L, 132 WL

[56] References Cited

U.S. PATENT DOCUMENTS

| | | |
|---|---|---|
| 2,858,556 | 11/1958 | Van Der Lans . |
| 3,000,138 | 9/1961 | Togliaferri ................. 104/112 X |
| 3,089,434 | 5/1963 | Andreasen . |
| 3,562,836 | 2/1971 | Frew et al. . |
| 3,604,042 | 9/1971 | Bremner et al. . |
| 3,800,358 | 4/1974 | Ryan . |
| 3,854,419 | 12/1974 | Cocroft ......................... 104/112 X |
| 3,890,905 | 6/1975 | Clavin . |
| 3,956,995 | 5/1976 | Lecordier . |
| 3,958,026 | 5/1976 | Leone et al. . |
| 3,977,331 | 8/1976 | Clavin . |
| 3,995,439 | 12/1976 | Hahlbrock . |
| 4,087,981 | 5/1978 | Norman . |
| 4,112,850 | 9/1978 | Sigel-Gfeller . |
| 4,177,734 | 12/1979 | Rhoden . |
| 4,244,296 | 1/1981 | Vertut . |
| 4,356,039 | 10/1982 | Clifford . |
| 4,364,141 | 12/1982 | Crane . |
| 4,520,524 | 6/1985 | Long, Jr. . |
| 4,622,709 | 11/1986 | Matsuda . |
| 4,677,865 | 7/1987 | Lehmann . |
| 4,763,376 | 8/1988 | Spurlock, Jr. et al. . |
| 4,773,115 | 9/1988 | Smith . |
| 4,817,653 | 4/1989 | Krajicek et al. . |
| 4,938,167 | 7/1990 | Mizuho et al. . |
| 4,957,047 | 9/1990 | Feuz et al. ...................... 104/112 X |
| 5,040,487 | 8/1991 | Bollyky et al. . |
| 5,069,722 | 12/1991 | Murphy ..................... 15/104.05 X |

FOREIGN PATENT DOCUMENTS

| | | | |
|---|---|---|---|
| 52270 | 5/1982 | European Pat. Off. ......... 15/104.31 |
| 120171 | 5/1990 | Japan ............................... 104/138.2 |

OTHER PUBLICATIONS

Mussalli, Y. G., American Power Conference 52nd Annual Meeting, "Effective Control Technologies for Zebra Mussels: Worldwide Experiences", pp. 1-6, Apr. 23-25, 1990.

Primary Examiner—Dennis L. Taylor
Assistant Examiner—Arlen L. Olsen
Attorney, Agent, or Firm—Jones, Tullar & Cooper

[57] ABSTRACT

An underwater robot is employed to clean and/or inspect the inner surfaces of high flow rate water inlet pipes for various facilities, such as power plants, water treatment plants, etc. The robot crawls along a cable positioned within a pipe to be inspected or cleaned, and in one embodiment, includes a plurality of guidance fins which rely upon the flow of water through the pipe to position the robot therein as desired. Retractable legs can also be provided to fix the robot at a location within the pipe when it is employed to clean the pipe using a water jet or similar system. The robot can also include a water driven turbine for generating electricity for the various motors, servos and other actuators contained on board the robot. Also, the robot preferably includes wheel or pulley arrangements which further help the robot to negotiate sharp corners or other obstructions within the pipe to be inspected or cleaned.

15 Claims, 9 Drawing Sheets

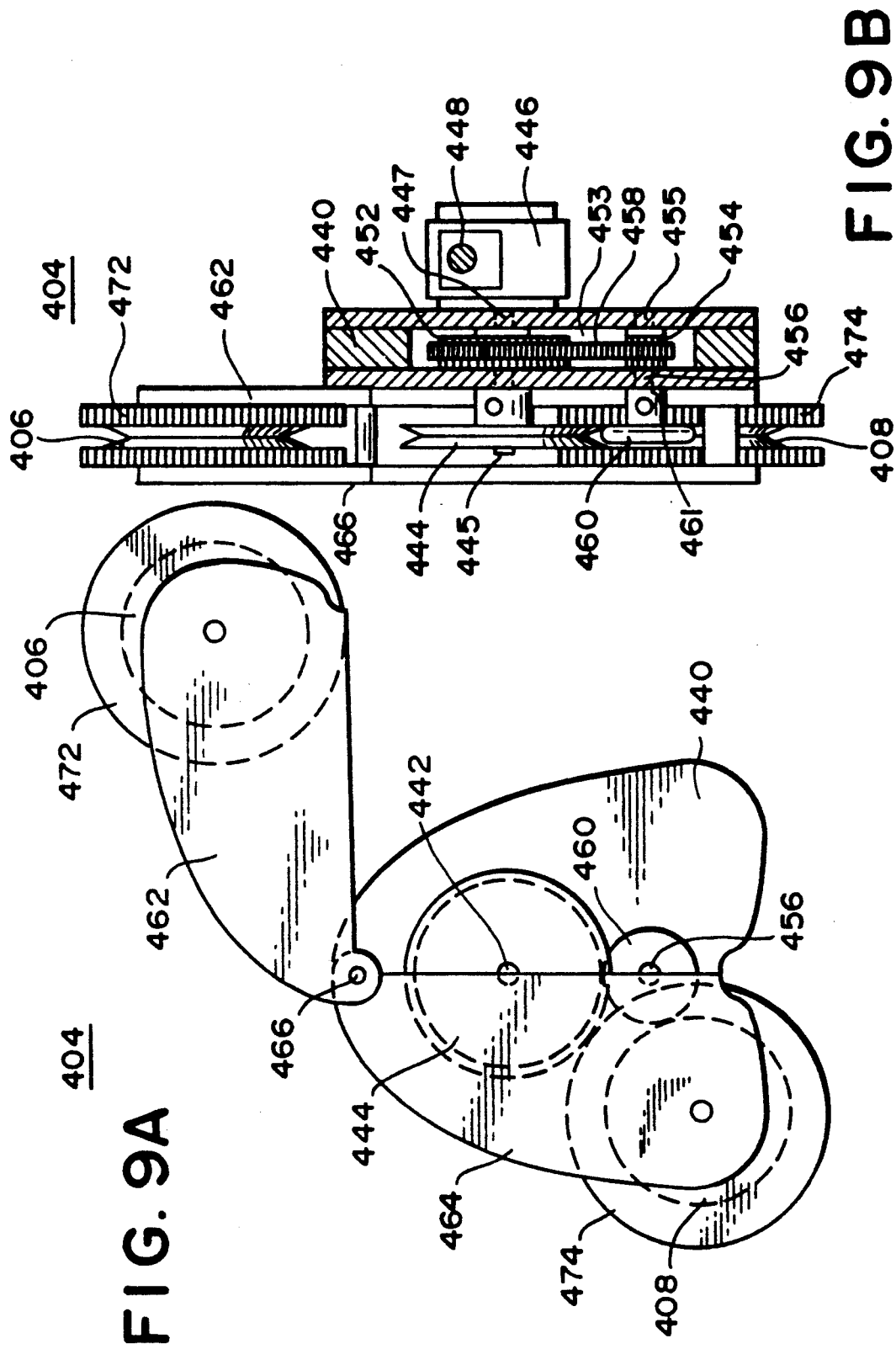

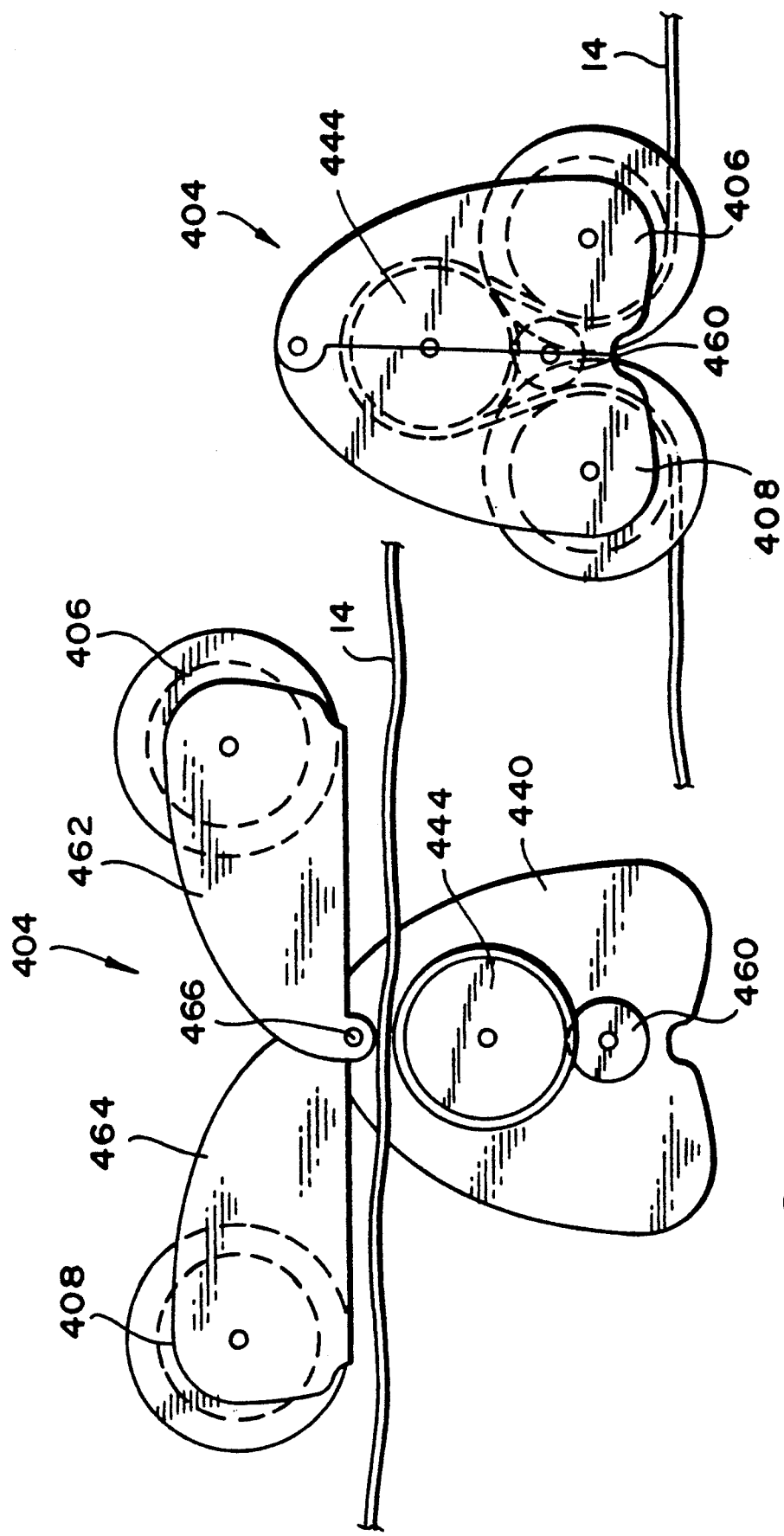

CABLE CRAWLING UNDERWATER INSPECTION AND CLEANING ROBOT

BACKGROUND OF THE INVENTION

The present invention relates in general to an underwater robot for inspecting and cleaning the interior surfaces of water pipes which propels itself along cables disposed within the pipes.

In recent years, infestation of fresh water pipe inlets by zebra mussels has presented a serious problem to power plants, manufacturing facilities, refineries and municipal water suppliers which draw water from the Great Lakes. The zebra mussel has been spreading throughout the Great Lakes since it was first discovered in 1988 in Lake St. Clair. These organisms attach themselves to the inner surfaces of large diameter fresh water inlet pipes for facilities such as power stations, water treatment plants, etc., and quickly reproduce to such an extent that water flow through the pipes is impeded, thereby adversely affecting the facility's operation. This usually requires shut down of the facility so that measures can be taken to remove the mussels from the pipes.

Various techniques have been proposed to cope with this problem which either prevent the attachment and growth of the mussels in the first place, or provide a mechanical removal process. The prevention techniques include the use of chemicals, such as chlorine, or the use of heat treatment in which hot water is caused to flow through the pipes periodically. The use of chemicals, although effective, is not permitted in most instances because of Environmental Protection Agency regulations, while the use of hot water treatment requires the installation of additional equipment which may be too costly.

Various mussel cleaning and removal techniques have also been proposed and include the use of human divers and mechanical "pigs" which are simple water pressure driven scrapers that work themselves along the lengths of the pipes. Divers are currently the most commonly employed means for scraping mussels from pipe walls, but this is unsafe, prohibitively expensive and requires pipe shutdown. Mechanical pigs or robots have been used with success in mildly obstructed pipes where access to the inlet is not difficult and where pipes can be shutdown for prolonged periods of time. If the pipes are excessively clogged, however, the pigs have a tendency to get stuck in them. In addition, most facilities in the United States do not have redundant pipelines so that the shutdown of the pipes for prolonged periods of time is prohibited. Further, access to the pipes is often made difficult because of sharp bends or corners and other protrusions which get in the way of the pigs and prevent them from advancing through the pipes. Finally, pipe geometry, including both size and shape of pipe, not only varies from one pipe to another, but often varies within the length of a single pipe.

In spite of their drawbacks, the use of underwater robots or pigs appears to be the most promising solution to the problem. What is therefore needed is to devise an underwater robot which not only can be employed during normal operation of the pipes, but also is specifically designed to negotiate obstacles and sharp corners within the pipes.

SUMMARY OF THE INVENTION

The present invention addresses these problems by providing an underwater robot which is secured to, and crawls along, a cable positioned within a pipe to be inspected and/or cleaned. This arrangement ensures that the robot can advance through the pipe even in the presence of a high water flow rate which can occur during normal operation of the facility served by the pipe. In addition, the cable crawler arrangement helps prevent the robots from getting stuck by an obstruction since the robot is not dependent upon the pipe surface or geometry for propulsion.

The robot preferably includes one or more cable drive means which engage the cable and propel the robot along the same. If the robot is used solely for inspection purposes, it preferably includes a housing having one or more inspection cameras disposed thereon and a plurality of adjustable guiding fins to allow the robot to move itself to any position within a pipe to avoid getting caught therein. This guidance arrangement works particularly well when the robot is disposed within a pipe having a constant and significant flow of water therein. In this case, even a robot which is sitting still within the pipe, engaging the cable, has enough water flowing by it that the guidance fins can be used to position the robot laterally within the pipe, thereby enabling the robot to negotiate sharp corners or obstacles in the pipe.

In a modification of one preferred embodiment, the robot housing has a plurality of pairs of V-shaped legs attached to each side thereof. Each of the legs has a wheel disposed at its end which engages and rolls along the pipe wall as the robot crawls along the cable. If the robot approaches a sharp corner or other obstruction in the pipe, the V-shaped pair of wheeled legs enables the robot to negotiate the corner or obstruction without getting stuck.

In another preferred embodiment of the present invention, wheels which are a part of the cable drive means are exposed and enable the cable crawler to negotiate corners and other obstacles. The drive means in this embodiment also enables the cable crawler to be attached to the cable easily. In particular the means includes a motor driven drive pulley and pinch roller, and two idle pulleys which coact with one another to engage and pinch the cable so that the robot will be driven along the cable. The two idle pulleys act to push the cable into contact with the pinch roller and are mounted on pivotable sheaves which can be swung open to allow placement of the cable in the cable drive means. When both sheaves are swung closed, the cable automatically winds around the drive pulley and idle pulleys, and pinches the cable into the pinch roller. The hinged sheaves then lock together sealing off the drive pulley and pinch roller from the environment.

When the robot is used for cleaning purposes, a plurality of retractable legs can be provided which are extendable into engagement with the pipe wall to hold the robot securely in position within the pipe. A high pressure water jet disposed at the end of an adjustable arm attached to the robot housing can then be employed by the robot to dislodge any debris or organisms, such as zebra mussels, from the pipe wall.

Since the robot is designed to operate in a high flow environment, it also preferably includes a water flow driven turbine which extracts energy from the water that is converted to electricity by an on-board generator. This generator provides power to the cable crawler motor and guiding fin and leg servos or actuators, and substantially reduces or eliminates the need to run a bulky power supply tether to the robot, thereby allowing the tether to be a simple coaxial or fiber optic cable carrying only communication signals. This in turn reduces the size of the motor that is necessary to drive the cable crawler mechanism since the reduction in the size of the tether substantially reduces the amount of drag caused by the same.

BRIEF DESCRIPTION OF THE DRAWINGS

The advantages and features of the present invention will become apparent from the following detailed description of a number of preferred embodiments thereof, taken in conjunction with the accompanying drawings, in which:

FIGS. 9A and 9B are front and side cross sectional views, respectively, of another cable drive means which can be employed with the embodiments of the invention; and, FIGS. 9C and 9D are diagrammatic illustrations showing the placement of a cable in the cable drive means of FIGS. 9A and 9B.

DETAILED DESCRIPTION OF THE PREFERRED EMBODIMENTS

Figure 1:
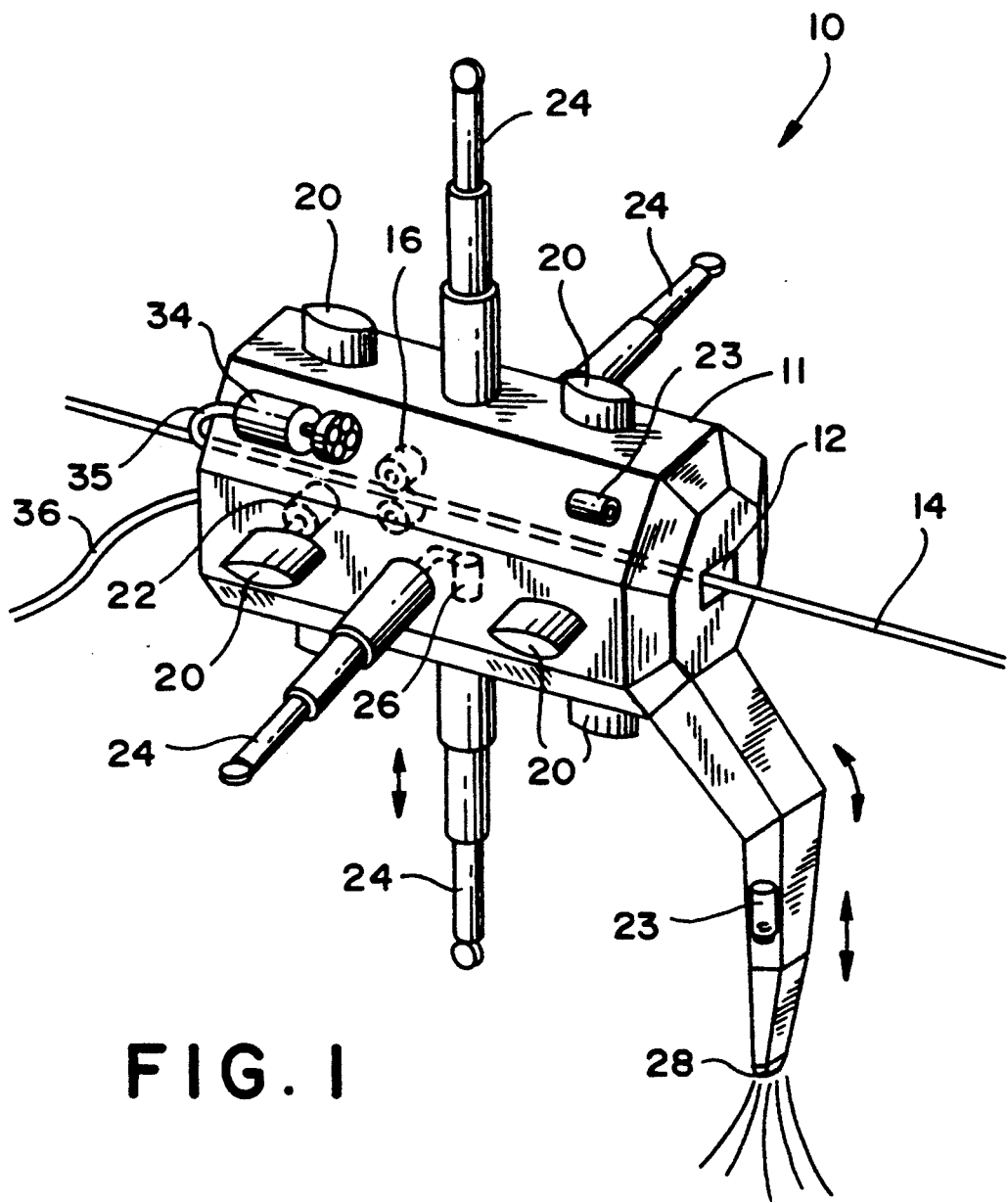
FIG. 1 is a diagrammatic perspective illustration of a cable crawling robot which forms a first preferred embodiment of the invention, with portions of the robot being shown in phantom.

Turning now to a more detailed consideration of a number of preferred embodiments of the present invention, FIG. 1 illustrates a first preferred embodiment comprising a cable crawling robot 10 which is to be positioned within an underwater pipe or other hollow structure to be inspected or cleaned. The robot 10 includes a housing 11 having a centrally disposed aperture 12 running the length thereof for reception of a cable 14. The cable 14 has one of its ends (not shown) fixed, and the robot 10 is designed to move along the cable 14 by means of one or more cable drive means 16 disposed in the housing 11. Specific examples of suitable cable drive means are discussed below in conjunction with FIGS. 2 and 9A-D.

The robot 10 also preferably includes a plurality of guidance fins 20 spaced around the periphery of the housing 11 which are angularly adjustable by means of a servo motor drive arrangement 22 (only one illustrated for clarity). These fins can be adjusted to guide the robot 10 to any desired lateral position within a pipe or other structure to be cleaned or inspected so that close inspection of the pipe or structure can be made by means of one or more illuminated inspection cameras 23. In addition, the fins 20 enable the robot 10 to negotiate corners or obstacles, such as flanges, in the pipe. It will be understood that in order for the fins 20 to provide the necessary guidance of the robot 10, a fairly substantial flow of water will be required in the pipe or other hollow structure to be inspected or cleaned.

The robot 10 also preferably includes a plurality of telescoping retractable legs 24 which can be extended by means of a conventional hydraulic or other suitable actuator 26 (only one illustrated for clarity) to brace the robot 10 within a pipe or other structure during a cleaning operation. This is helpful if the robot 10 is employed to remove zebra mussels or other debris from within a pipe through use of a high pressure water jet arrangement 28, for example. If such a cleaning arrangement is employed, the robot 10 must be securely positioned within the pipe to be cleaned so that the water jet 28 can be accurately controlled. As illustrated, the water jet 28 is disposed at the end of a conventional multiple jointed adjustable robotic arm 30 which is mounted on a rotatable end portion 32 of the robot housing 11 to permit precise positioning of the water jet 28 within a pipe or other structure to be cleaned.

As an option, a turbine-generator pair 34 can be positioned in or on the robot housing 11 to extract energy from the water flowing through and past the robot 10, and convert it to electricity for powering the various motors, servos and actuators through a cable 35. Additional power can be fed to the robot 10 from a remote location via a communication and power cable 36. The circuitry employed to control the various motors, servos and actuators is discussed in conjunction with FIG. 3. If the turbine-generator pair 34 generates enough electricity to power all of the robot's electronics, then the cable 36 can be employed solely for communications and be made of a small coaxial, fiber optic or other suitable cable. In this case, the drag on the robot caused by the cable is substantially reduced.

Figure 2:
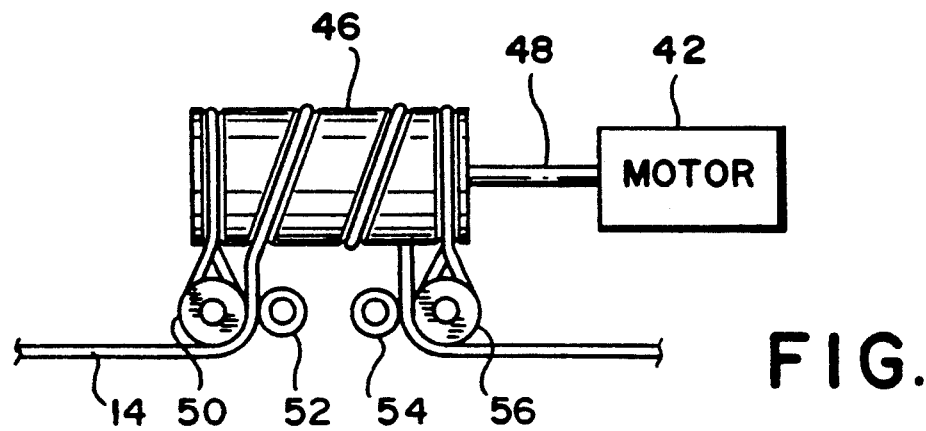
FIG. 2 is a diagrammatic illustration of a cable drive means which can be employed with the embodiment of FIG. 1.

An example of a first cable drive means for the cable crawling robot 10 is illustrated in FIG. 2 In particular, the cable drive means 16 in FIG. 2 includes a motor 42 which drives a pair of belt and pulley arrangements 44 in a spool drive mechanism 46 through a drive shaft 48. The cable 14 is wrapped around the spool drive 46 and engages a plurality of pulleys 50, 52, 54 and 56 of the belt and pulley arrangements 44 so that as the spool 46 and pulleys 50 and 56 are driven, the robot 10 will move along the cable 14.

Figure 3:
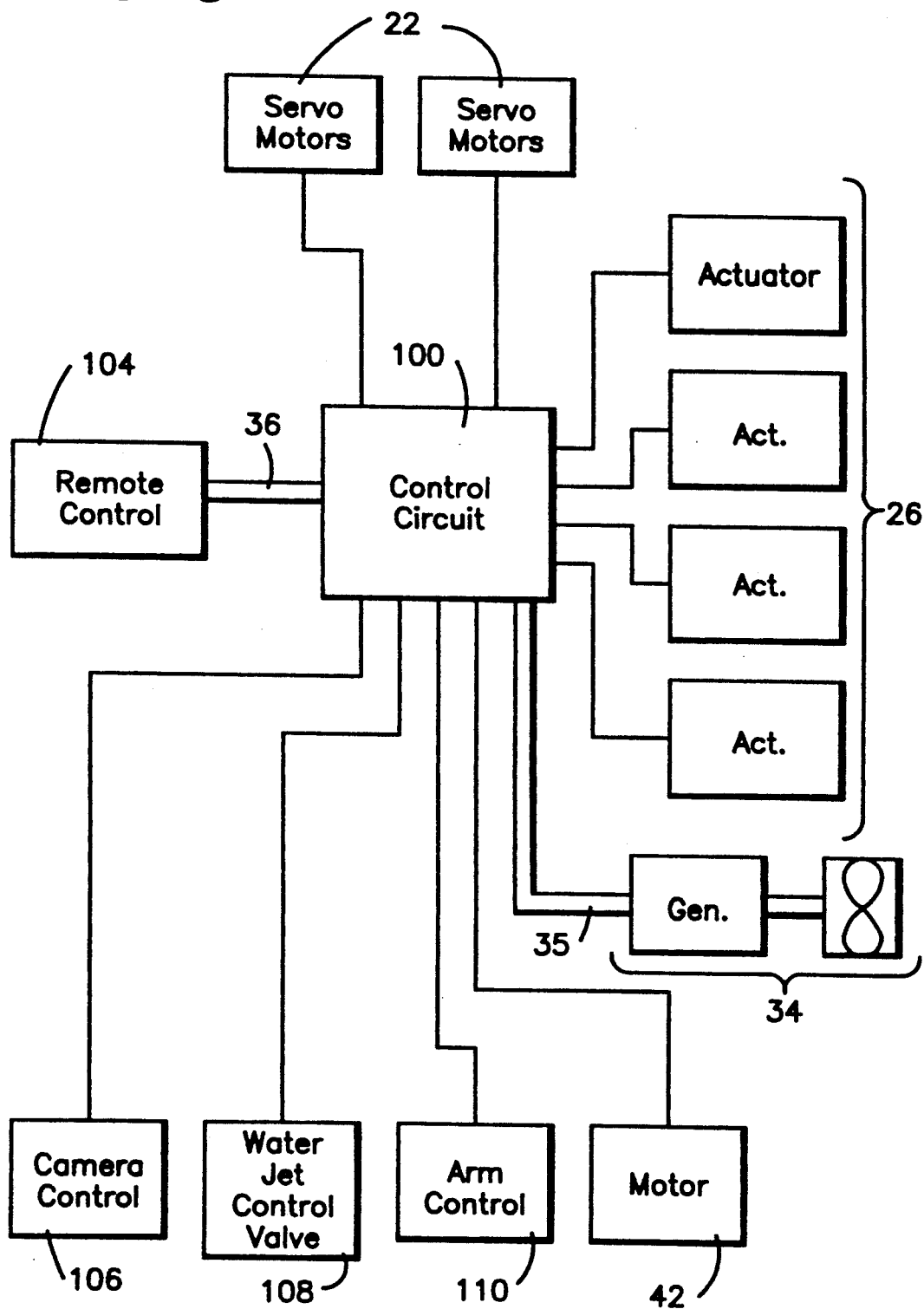
FIG. 3 is a schematic diagram of a control circuit which can be employed with the robot of FIG. 1.

Turning now to FIG. 3, a circuit diagram for controlling the various elements of the robot 10 is illustrated. In particular, a robot carried control circuit 100 is controlled through the communication and power cable 36 by a remote control unit 104, which is preferably positioned at an accessible location. The control circuit 100 is connected to the motor 42 for the one cable drive means 16 and the various servo motors 22 and actuators 26 for the guidance fins 20 and retractable legs 24, respectively. In addition, the control circuit 100 controls operation of the illuminated inspection cameras 23, water jet 28 and robotic arm 30 through means of a camera control mechanism 106, water jet control valve 108 and arm control servo mechanism 110, respectively.

Figure 4:
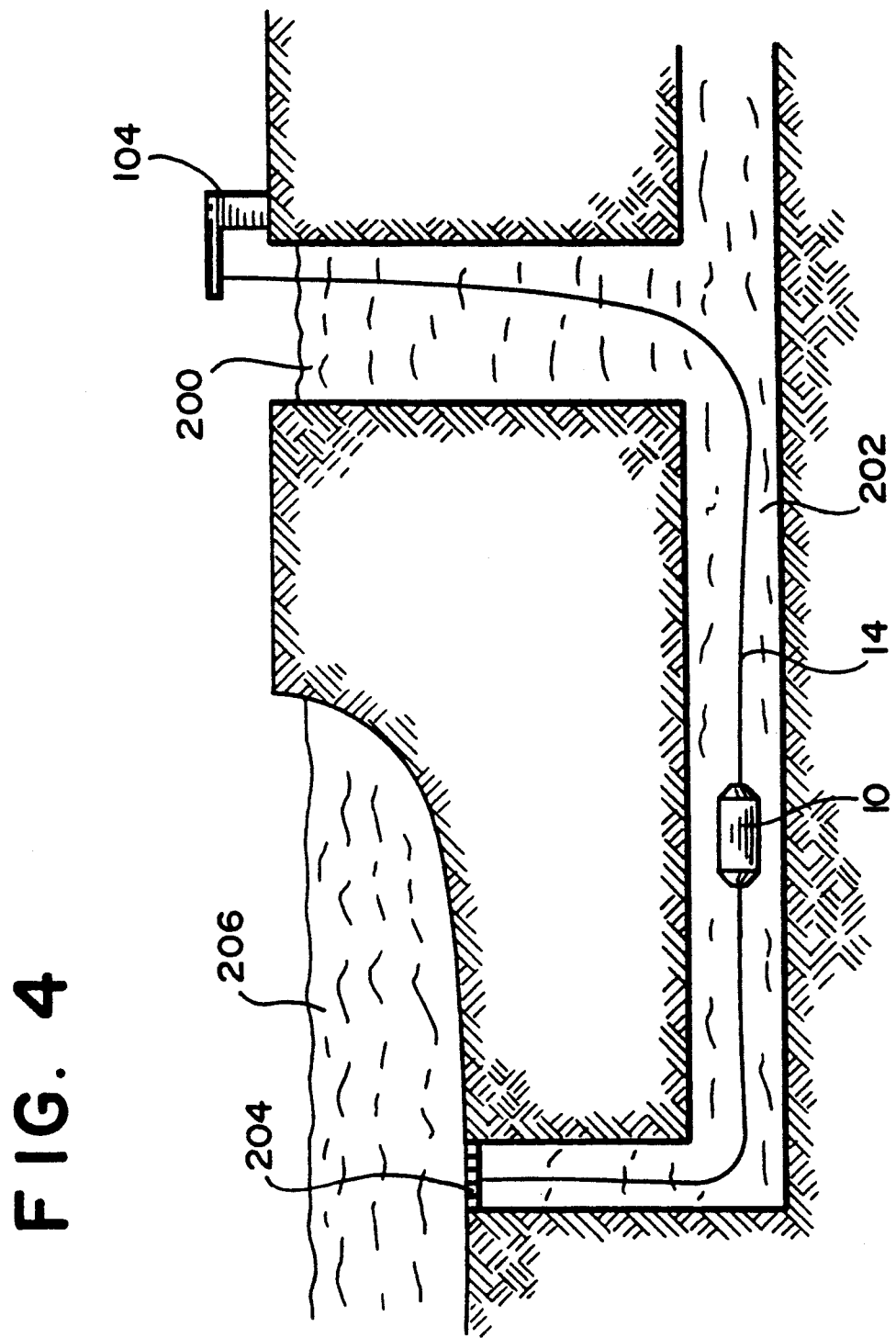
FIG. 4, is a diagrammatic illustration showing the positioning of the robot of FIG. 1 in a water pipe to be inspected or cleaned.
Figure 5A:
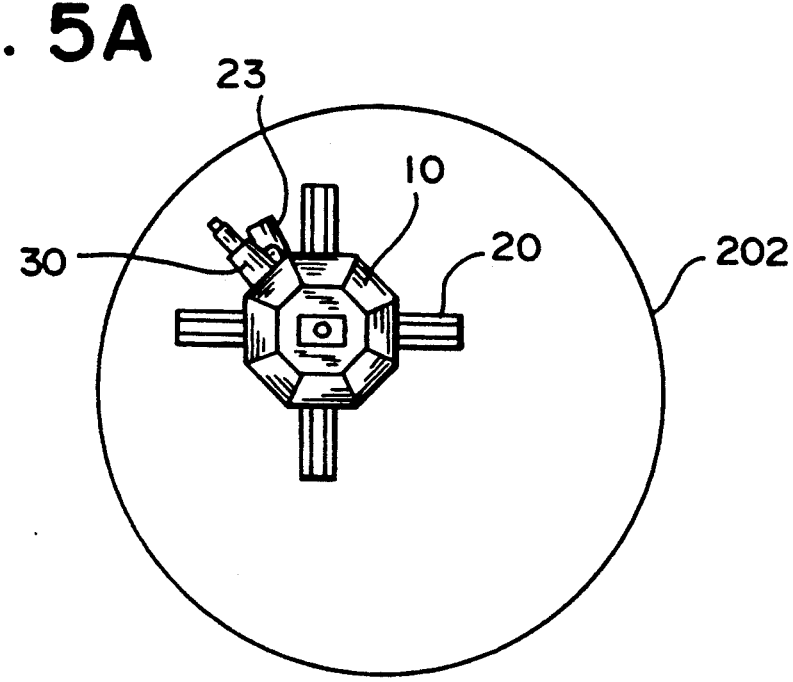
FIGS. 5A and 5B are diagrammatic illustrations of the robot of FIG. 1 positioned within a water pipe to either inspecting or cleaning the same, respectively.
Figure 5B:
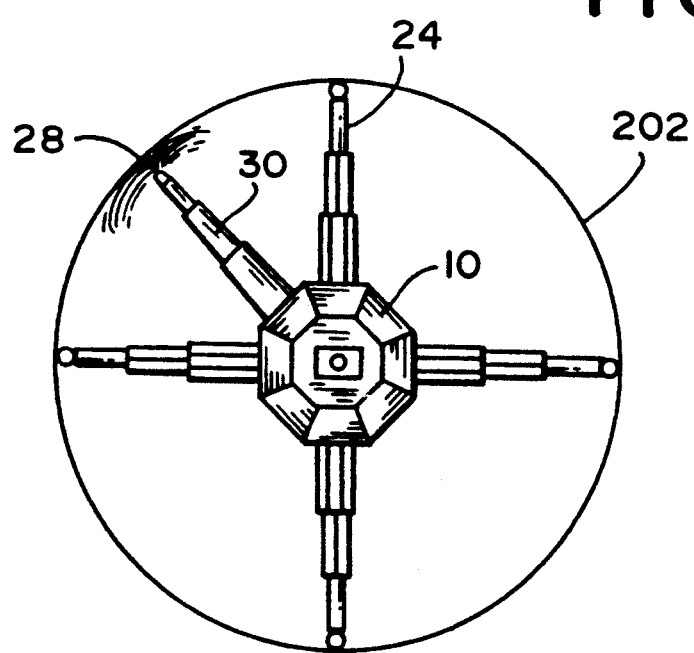

Turning now to FIGS. 4, 5A and 5B, the operation of the robot 10 is illustrated. First, the robot is attached to the cable 14 at the surface, and then the cable drive means 16 is actuated to propel the robot 10 along the cable 14 down an access hole 200 and into a pipe 202 to be inspected or cleaned. As illustrated, the cable 14 is secured at the opposite end to an inlet 204 of the pipe 202 from a lake or other body of water 206. The operation of the robot 10 is controlled from the surface by the remote control unit 104 through the communication and power cable 36.

As the robot 10 propels itself along the cable 14 through the pipe 202, it can be used either for inspecting the inner surfaces of the pipe, or for removing zebra mussels or other debris therefrom. When the robot is used for inspecting the pipe 202 with the cameras 23, the guidance fins 20 are employed to move the robot 10 laterally within the pipe 202 as illustrated in FIG. 5A so that a close inspection of the pipe can be conducted.

If during the inspection of the pipe 202, zebra mussels or other obstructions are found located within the pipe, the retractable legs 24 are extended into engagement with the inner surfaces of the pipe 202 as illustrated in FIG. 5B so that the robot 10 is effectively anchored within the pipe. The water jet 28 is then actuated to remove the zebra mussels or other obstructions from within the pipe 202.

Figure 6:
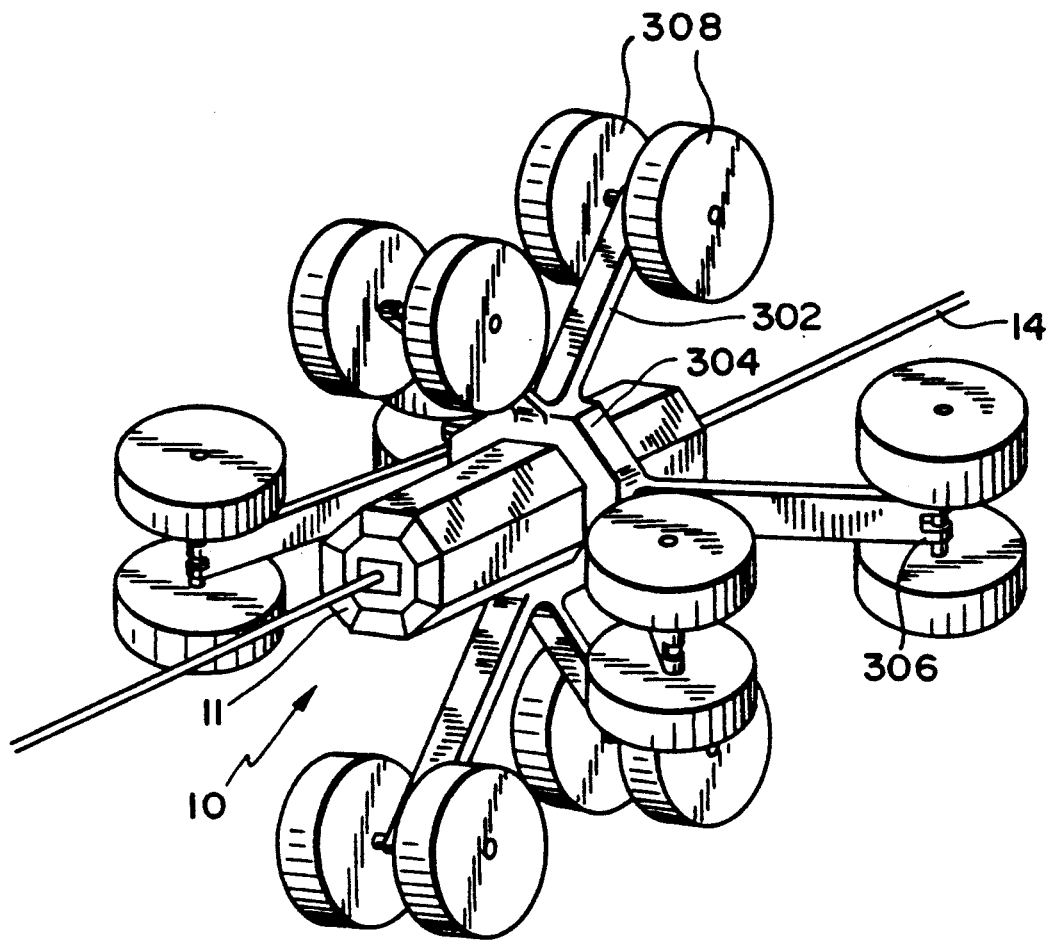
FIG. 6 is a schematic perspective illustration of a modification to the cable crawling robot of FIG. 1 which enables the robot to negotiate obstacles and corners.

In some instances it may be necessary for an inspection or cleaning robot to negotiate sharp corners or other obstructions within a pipe to be inspected or cleaned. If this is the case and a high flow rate of water is not present in the pipe to enable negotiation of these obstacles through use of the guidance fins 20 on the robot 10 of FIG. 1, then another type of supplemental guidance mechanism must be employed. Such a mechanism is illustrated in the embodiment of the present invention illustrated in FIG. 6. In particular, FIG. 6 shows the cable crawling robot 10 having four pairs of V-shaped legs 302 attached to four sides of a flange 304 disposed around the circumference of the housing 11 (for clarity, the guidance fins 20, retractable legs 24, adjustable arm 30 and cameras 23 are not illustrated in FIG. 5). Each of the V-shaped legs 302 has a pair of free ends 306, at each of which is disposed a roller pair 308. There are therefore a total of eight of the roller pairs 308 which are employed to engage the inner surface of a pipe to be inspected or cleaned as the cable crawler robot 10 advances therethrough.

Figure 7:
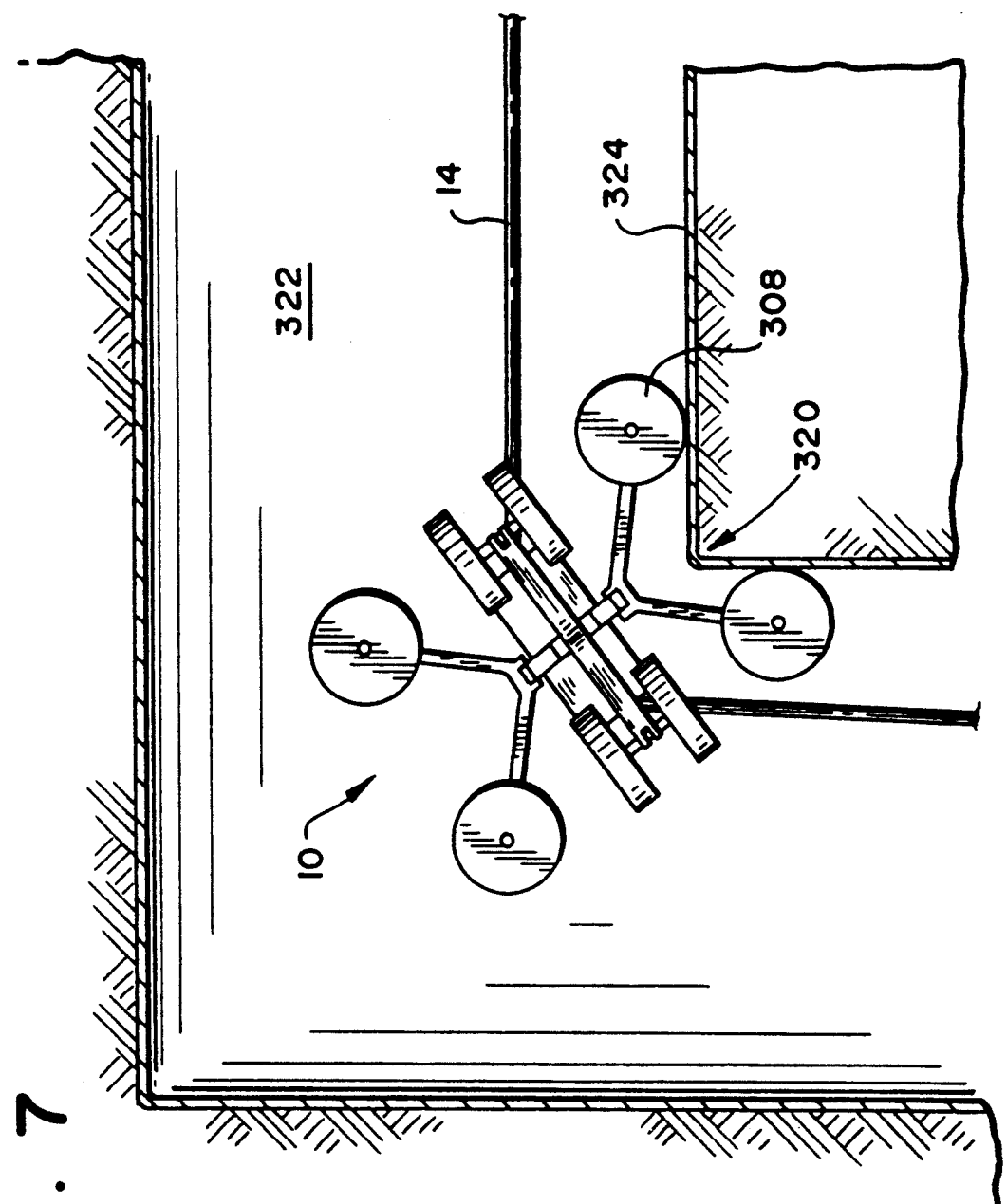
FIG. 7 is a diagrammatic illustration showing the negotiation of a corner by the robot of FIG. 6.

The operation of the robot 10 of FIG. 6 as it negotiates a sharp corner 320 within a pipe 322 to be inspected or cleaned is illustrated in FIG. 7. In particular, it can be seen that as the robot 10 negotiates the corner 320, the V-shaped leg and roller pairs 308 disposed on the ends thereof allow the robot 10 to negotiate the corner 320 without having any part of the robot contact an inner pipe wall 324 with the exception of roller pairs 308. This arrangement therefore effectively prevents the robot 10 from getting stuck at a corner or obstruction within a pipe to be inspected or cleaned. Further, the use of four pairs of the V-shaped legs and associated roller pairs ensures that the roller pairs 314 will enable the robot 10 to negotiate corners or other obstructions regardless of the orientation of the robot 10 relative to the corner or obstruction.

Figure 8:
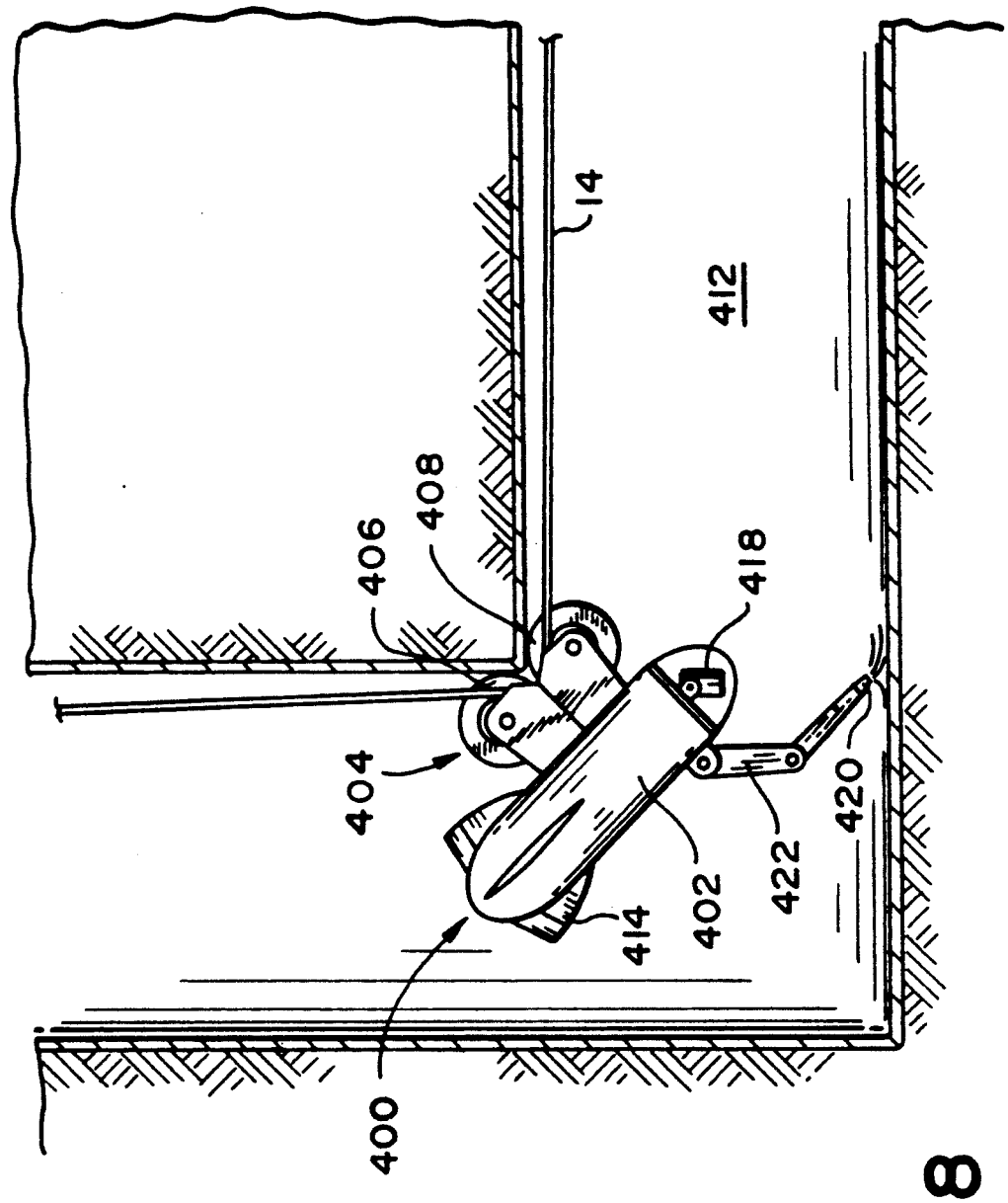
FIG. 8 is a diagrammatic illustration showing the negotiation of a corner by another type of cable crawling robot which forms a second preferred embodiment of the invention.

Another preferred embodiment of the present invention is illustrated in FIG. 8. In particular, another type of cable crawling robot 400 is illustrated in FIG. 8 which employs a simplified means for negotiating corners or other obstacles. In particular, the robot 400 includes a housing 402 and a cable drive means 404 including a pair of idle pulleys 406 and 408 which are partially exposed and can engage an obstacle to guide the robot 400 around the same. FIG. 8 shows the pulleys 406 and 408 engaging a corner 410 of a bent pipe 412 and guiding the robot 400 around the same. The robot 400 also includes a plurality of adjustable guidance fins 414, one or more inspection cameras 418 and a water jet 420 disposed at the end of an adjustable robotic arm 422. The adjustable guidance fins 414 eliminate the need for retractable legs to brace or position the robot 400 within a liquid filled pipe. In particular, the fins 414 enable controlled flight of the robot 400 within the pipe so that it can be held in position therein in any desired orientation.

Turning now to FIGS. 9A-D, the design and operation of the cable drive means 404 for the robot 400 of FIG. 8 are illustrated. With reference first to FIGS. 9A and 9B, the cable drive means 404 includes a frame 440 which permits it to be attached by any suitable means (not shown) to or within the robot housing 402. A first drive shaft 442 is mounted within the frame 440 and a cable drive pulley 444 is mounted on a first end 445 of the first drive shaft 442. A gear box 446 is mounted at a second end 447 of the first drive shaft 442 which contains a bevel gear arrangement (not shown). An input shaft 448 to the gear box 446 is connected to, and driven by, a reversible motor (not shown).

A first gear 452 is mounted on the first drive shaft 442 between the drive pulley 444 and the gear box 446, and is contained within an enclosure 453 in the frame 440. A second gear 454 is mounted on a first end 455 of a second drive shaft 456 and is also contained within the enclosure 453. The second gear 454 is driven from the first gear 452 by means of a drive belt 458. The second gear 454 in turn drives a pinch roller 460 disposed on a second end 461 of the second drive shaft 456.

First and second sheaves 462 and 464 are pivotably mounted to the frame 440 by means of a pivot pin 466. The first idle pulley 406 is rotatably mounted on the first sheave 462, while the second idle pulley 408 is rotatably mounted on the second sheave 464. The idle pulleys 406 and 408 include a pair of extended rim portions 472 and 474, respectively, whose function is described below.

Turning now to FIGS. 9C and 9D, the operation of the cable drive means 404 is illustrated. When the robot 400 is to be attached to the cable 14, the pulley sheaves 462 and 464 are rotated upward about the pivot pin 466 as illustrated in FIG. 9C so that the cable 14 can be positioned between the drive pulley 444 and the pivot pin 466. Next, as illustrated in FIG. 9D, the sheaves 462 and 464 are rotated back down and secured by any suitable means (not shown) in their operating positions so that the cable 14 is wrapped around the drive pulley 444, and is also pinched between the pinch roller 460 and the idle pulleys 406 and 408.

Actuation of the motor in a desired direction causes rotation of the drive pulley 444 and pinch roller 460 by means of the gear box 446, first and second gears 452 and 454, and the drive belt 458. The relative sizes of the gears 452 and 454 are chosen so that the drive pulley 444 and pinch roller 460 drive the cable 14 at the same speed. The idle pulleys 406 and 408 act to redirect the cable 14 and to force it into engagement with the pinch roller 460. This pinching provides the necessary tension on the low tension side of the cable, which is the side of the cable drive means 404 that the cable is exiting, to wedge the cable 14 into the drive pulley 444. The relative positioning of the pinch roller 460, pivot pin 466 and idle pulleys 406 and 408 provide a self-energizing pinch on the low tension side only.

The extended rim portions 472 and 474 of the idle pulleys 406 and 408, respectively, therefore serve a dual purpose. In particular, they guide the entering and exiting cable into and out of the cable drive means 404. In addition, as discussed previously and illustrated in FIG. 8, they enable the robot 400 to roll along a wall, over an obstacle or around a corner. In this case, the frictional force of the pinch roller 460 on the cable 14 and the wedging of the cable 14 into the idle pulleys 406 and 408 provides the torque to the extended rim portions 472 and 474 which then help the robot roll along the wall or over obstacles. It will be understood, however, that the same drive mechanism 404 could be disposed internally in the housing 11 of the robot 10 of FIG. 1, although the mechanism thus mounted could not enable the robot 10 to negotiate corners and an arrangement such as that illustrated in FIG. 6 would be required for that purpose.

As can be therefore seen, the present invention provides an underwater pipe inspection and cleaning robot which can be employed in the presence of high flow rates within pipes so that the pipes can be inspected for and cleaned of zebra mussels or other debris without requiring shut down of the facility served by the pipe. Further, the present invention provides improved arrangements which help ensure that the underwater robot will not get stuck at corners or other obstructions within a pipe to be inspected or cleaned.

Although the invention has been disclosed in terms of a number of preferred embodiments, it will be understood that numerous other variations and modifications could be made thereto without departing from the scope of the invention as set forth in the following claims.

What is claimed is:

1. A robot for cleaning and/or inspecting interiors of fluid containing hollow objects comprising:
   a robot housing for carrying cleaning and/or inspection tools;
   drive means in said housing for engaging and advancing said robot along a cable disposed within a fluid containing hollow object to be cleaned and/or inspected; and,
   guidance means to guide said robot through a hollow object to be inspected and/or cleaned as said robot advances along a cable to which it is engaged, said guidance means comprising a plurality of adjustable fins spaced on an outer surface of said robot housing for steering said robot through fluid contained within the hollow object.

2. The robot of claim 1 further including a plurality of retractable legs disposed within said housing which can be extended to engage the inner surfaces of a hollow object to be inspected and/or cleaned so that said robot can be anchored within a hollow object to be inspected or cleaned during a cleaning operation.

3. The robot of claim 1 further including a turbine and generator pair attached to said housing to extract energy from a flow of water in a hollow object to be inspected and/or cleaned and convert said energy to electricity for use in powering said underwater robot.

4. The robot of claim 1 wherein said drive means comprises at least one motor driven pulley disposed in said robot housing.

5. The robot of claim 1 wherein said drive means comprises:
   a) a frame;
   b) a first drive shaft mounted in said frame having a first end and a second end;
   c) a drive pulley attached to said first end of said first drive shaft for engaging a cable;
   d) means to rotate said first drive shaft and said drive pulley; and,
   e) first and second sheaves attached by means of a pivot to said frame having first and second idle pulleys, respectively, mounted thereon, said sheaves being positionable in a first, nonoperational position in which a cable can be placed between said drive pulley and said pivot, and in a second, operational position in which said first and second idle pulleys coact with said drive pulley to pinch a cable between said idle pulleys and said drive pulley.

6. The robot of claim 5 wherein said drive means further comprises:
   f) a second drive shaft mounted in said frame having first and second ends, said second drive shaft also being rotatable by said means to rotate; and,
   g) a pinch roller attached to said first end of said second drive shaft and positioned to coact with said first and second idle pulleys and cause a cable to be pinched between said pinch roller and said idle pulleys.

7. The robot of claim 1 wherein said drive means comprises:
   a) a spool around which a cable along which said robot is to be advanced can be wrapped; and
   b) means to rotate said spool.

8. A robot for cleaning and/or inspecting interiors of fluid containing hollow objects comprising:
   a robot housing for carrying cleaning and/or inspection tools;
   drive means in said housing for engaging and advancing said robot along a cable disposed within a fluid containing hollow object to be cleaned and/or inspected;
   guidance means to guide said robot through a hollow object to be inspected and/or cleaned as said robot advances along a cable to which it is engaged; and,
   a turbine and generator pair attached to said housing to extract energy from a flow of fluid in a hollow object to be inspected and/or cleaned and convert said energy to electricity for use in powering said robot.

9. A robot for cleaning and/or inspecting interiors of fluid containing hollow objects comprising:
   a robot housing for carrying cleaning and/or inspection tools;
   drive means in said housing for engaging and advancing said robot along a cable disposed within a fluid containing hollow object to be cleaned and/or inspected; said drive means comprising:
   a) a frame;
   b) a first drive shaft mounted in said frame having a first end and a second end;
   c) a drive pulley attached to said first end of said first drive shaft for engaging a cable;
   d) means to rotate said first drive shaft and said drive pulley;
   e) first and second sheaves attached by means of a pivot to said frame having first and second idle pulleys, respectively, mounted thereon, said sheaves being positionable in a first, nonoperational position in which a cable can be placed between said drive pulley and said pivot, and in a second, operational position in which said first and second idle pulleys coact with said drive pulley to pinch a cable between said idle pulleys and said drive pulley.

f) a second drive shaft mounted in said frame having first and second ends, said second drive shaft also being rotatable by said means to rotate;

g) a pinch roller attached to said first end of said second drive shaft and positioned to coact with said first and second idle pulleys and cause a cable to be pinched between said pinch roller and said idle pulleys; and, guidance means to guide said robot through a hollow object to be inspected and/or cleaned as said robot advances along a cable to which it is engaged.

10. A robot for cleaning and/or inspecting interiors of fluid containing hollow objects comprising:

a robot housing for carrying cleaning and/or inspection tools;

drive means in said housing for engaging and advancing said robot along a cable disposed within a fluid containing hollow object to be cleaned and/or inspected;

guidance means to guide said robot through a hollow object to be inspected and/or cleaned as said robot advances along a cable to which it is engaged, said guidance means comprising a plurality of V-shaped legs attached to said robot housing, each said pair of V-shaped legs having a pair of free ends and roller means disposed at said free ends for engaging the inner surfaces of a hollow object to be inspected and/or cleaned; and, a plurality of retractable legs disposed within said housing which can be extended to engage the inner surfaces of a hollow object to be inspected and/or cleaned for anchoring said robot within a hollow object to be inspected or cleaned during a cleaning operation.

11. A method for cleaning obstructions from an interior wall of a water flow carrying pipe comprising the steps of:

a) positioning a cable within a water carrying pipe to be cleaned;

b) propelling a cable crawling robot along said cable into said water carrying pipe, said robot including a housing for carrying cleaning and/or inspection tools;

c) employing a plurality of adjustable guidance fins spaced on an outer surface of said robot housing to steer said robot laterally within the pipe to be cleaned to enable a close inspection of the pipe to be conducted;

d) anchoring said robot within said pipe if obstructions are found located within said pipe; and, e) cleaning the obstructions out of said pipe with said cleaning tools.

12. The method of claim 11 wherein the step of anchoring said robot further comprises extending a plurality of retractable legs disposed within said housing into engagement with the inner surfaces of the pipe to be cleaned.

13. The method of claim 11 wherein the step of cleaning said pipe further comprises employing a high pressure water jet arrangement mounted on said robot housing to clean the obstructions from the pipe.

14. The method of claim 13, wherein the step of cleaning includes removing zebra mussels with said high pressure water jet arrangement.

15. The method of claim 11, wherein the step of cleaning includes removing zebra mussels.

* * * * *